(12) United States Patent
Tian

(10) Patent No.: US 12,388,922 B1
(45) Date of Patent: Aug. 12, 2025

(54) BRACKET

(71) Applicant: Shenzhen Zhenwei Xin Technology Co., Ltd., Shenzhen (CN)

(72) Inventor: Wen Tian, Guangdong (CN)

(73) Assignee: SHENZHEN ZHENWEI XIN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/012,274

(22) Filed: Jan. 7, 2025

(30) Foreign Application Priority Data

Sep. 1, 2024 (CN) .......................... 202422135379.9
Sep. 1, 2024 (CN) .......................... 202422140116.7
Sep. 1, 2024 (CN) .......................... 202422152901.4

(51) Int. Cl.
*H04M 1/04* (2006.01)
*F16B 47/00* (2006.01)
*F16M 13/02* (2006.01)

(52) U.S. Cl.
CPC ............. *H04M 1/04* (2013.01); *F16B 47/006* (2013.01); *F16M 13/022* (2013.01)

(58) Field of Classification Search
None
See application file for complete search history.

(56) References Cited

U.S. PATENT DOCUMENTS

| 10,641,314 | B1 * | 5/2020 | Fan | ........................ F16B 47/006 |
| 2011/0210225 | A1 * | 9/2011 | Chen | ...................... F16B 47/006 |
| | | | | 248/363 |

\* cited by examiner

*Primary Examiner* — Frantz Bataille

(57) ABSTRACT

A bracket includes a base. The base includes a base body, a suction cup, and a connecting rod. The suction cup is provided at a bottom portion of the base body. The connecting rod is provided on the base body and connected to the suction cup. The connecting rod is movable between a first position and a second position along its axial direction. When the connecting rod is moved from the second position to the first position along its axial direction, the connecting rod is configured for driving the suction cup to rise to form a vacuum negative pressure cavity. When the connecting rod is moved from the first position to the second position along its axial direction, the connecting rod is configured for driving the suction cup to descend to release vacuum negative pressure in the vacuum negative pressure cavity.

20 Claims, 13 Drawing Sheets

BRACKET

CROSS-REFERENCE TO RELATED APPLICATIONS

The application claims priority of Chinese patent application CN2024221529014, filed on Sep. 1, 2024, which is incorporated herein by reference in its entireties. The application also claims priority of Chinese patent application CN2024221401167, filed on Sep. 1, 2024, which is incorporated herein by reference in its entireties. The application also claims priority of Chinese patent application CN2024221353799, filed on Sep. 1, 2024, which is incorporated herein by reference in its entireties.

TECHNICAL FIELD

The present invention relates to the field of brackets, particularly to a bracket.

BACKGROUND ART

At present, brackets are mainly used as a fixed accessory for mobile phones, camera devices, or other intelligent devices, and are widely used in daily life. The existing brackets are mainly fixed by adhering suction cups provided with adhesive to objects.

The Chinese invention patent with application No. 202320683949.0 discloses a technical solution in which a bracket uses a suction cup for suction and a protruding piece for taking is provided on a side end of the suction cup. In this technical solution, although the suction cup can be used for suction and the bracket can be disassembled by pulling the protruding piece to remove the suction cup, due to the protruding piece being arranged on an edge of the suction cup, there is a problem that accidental touching of the protruding piece in the process of use may cause failure of suction of the suction cup.

Therefore, it is urgent to research and develop a bracket to solve the problem of failure of suction of the bracket due to accidental touching.

SUMMARY

In order to overcome the shortcomings of the prior art, a bracket is provided in the present invention. A base of the bracket can improve the suction stability of the bracket base.

The technical solution adopted by the present invention to solve its technical problem is as follows.

A bracket is provided in the present invention, including a base. The base includes:
 a base body;
 a suction cup provided at a bottom portion of the base body; and
 a connecting rod provided on the base body and connected to the suction cup.

The connecting rod is movable between a first position and a second position along its axial direction.

When the connecting rod is moved from the second position to the first position along its axial direction, the connecting rod is configured for driving the suction cup to rise to form a vacuum negative pressure cavity. When the connecting rod is moved from the first position to the second position along its axial direction, the connecting rod is configured for driving the suction cup to descend to release vacuum negative pressure in the vacuum negative pressure cavity.

As an improvement of the present invention, the connecting rod is connected with a pin shaft. The base body is equipped with climbing tracks. The pin shaft cooperates with the climbing track to drive the connecting rod to move between the first position and the second position. A relative climbing motion of the pin shaft along the climbing track drives the connecting rod to move from the second position to the first position, and a relative descending motion of the pin shaft along the climbing track drives the connecting rod to move from the first position to the second position.

As an improvement of the present invention, the base body is provided with a rotating member. The rotating member is rotatable relative to the base body. The climbing track is formed on the rotating member. An end portion of the pin shaft extends into the climbing track and performs the relative climbing motion or the relative descending motion relative to the climbing track with the rotation of the rotating member.

The climbing track includes a first position limiting point and a second position limiting point. The first position limiting point is higher than the second position limiting point.

A total number of the climbing tracks is two. The two climbing tracks are opposite to each other and are arranged at positions of a top portion of the rotating member.

As an improvement of the present invention, the rotating member rotates relatively in a third position and a fourth position of the base body.

The rotating member rotates relative to the base from the third position to the fourth position, driving the pin shaft to perform the relative climbing motion from the second position limiting point of the climbing track to the first position limiting point, thereby driving the connecting rod to move from the second position to the first position.

The rotating member rotates relative to the base body from the fourth position back to the third position, driving the pin shaft to perform the relative descending motion from the first position limiting point of the climbing track back to the second position limiting point, thereby driving the connecting rod to move from the first position to the second position.

As an improvement of the present invention, the base body is covered with a first cover body. The rotating member, the connecting rod, and the pin shaft are positioned inside the first cover body. A swing groove is defined in the first cover body.

The rotating member is connected with a swing rod. An end portion of the swing rod passes through the swing groove and extends out of the first cover body.

As an improvement of the present invention, a top surface of the base body is provided with a first position limiting rod. A first arc-shaped position limiting groove is defined in the rotating member. The first position limiting rod passes through the first arc-shaped position limiting groove and cooperates with two ends of the first arc-shaped position limiting groove for position limiting.

As an improvement of the present invention, a restoration spring is sleeved on the connecting rod. One end of the restoration spring abuts against the suction cup, and an opposite end of the restoration spring abuts against the rotating member.

As an improvement of the present invention, the base body is provided with a second cover body. The rotating member, the connecting rod, and the pin shaft are positioned inside the second cover body. A connecting sleeve is provided in the second cover body.

Connecting convex blocks are provided on an outer wall of the rotating member, and connecting grooves engaged with the connecting convex blocks are defined in an inner wall of the connecting sleeve.

As an improvement of the present invention, at least one second position limiting rod is provided on a top surface of the base body. The second cover body is provided with a second arc-shaped position limiting groove corresponding to the second position limiting rod. The second position limiting rod passes through the second arc-shaped position limiting groove and cooperates with two ends of the second arc-shaped position limiting groove for position limiting.

As an improvement of the present invention, a protrusion is provided at a bottom portion of the suction cup. The protrusion extends towards one side away from the base body. When the connecting rod is moved from the first position to the second position along its axial direction, the connecting rod and the suction cup are driven to descend, the protrusion abuts against a suction surface of the suction cup, and the vacuum negative pressure in the vacuum negative pressure cavity between the suction cup and the suction surface is released, thus forming a disengaged state.

As an improvement of the present invention, a height of the protrusion is higher than a height of the suction surface of the suction cup. A bottom portion of the base body is provided with a rim. The rim corresponds to an outer peripheral edge of the suction cup.

As an improvement of the present invention, the connecting rod is moved from a second position back to a first position along its axial direction, driving the connecting rod to lift and pull the suction cup connected to the connecting rod to deform upward. A first gap is defined between the protrusion and the suction surface of the suction cup. The rim presses against the outer peripheral edge of the suction cup. The suction cup and the suction surface form a vacuum negative pressure cavity, thus forming a suction state.

In the suction state, the rim is pressed against the outer peripheral edge of the suction cup.

In the disengaged state, a second gap is defined between the rim and the suction cup, or the rim is in contact with the outer peripheral edge of the suction cup.

As an improvement of the present invention, the protrusion is provided at a central position of the suction cup. A bottom portion of the connecting rod is provided with a protruding column. The protruding column is positioned inside the suction cup, and the protruding column is at least partially positioned below the suction cup.

As an improvement of the present invention, the connecting rod and the suction cup are integrally formed. The suction cup is made of plastic or silicone material. An area of the protrusion accounts for 2%-65% of an area of the suction cup.

As an improvement of the present invention, a step is provided on the connecting rod. A plurality of holes extending along an axial direction is defined in the step. A flexible body is accommodated in the hole. The suction cup cooperates to receive the step. The flexible body inside the hole is integrally connected to the suction cup.

When the connecting rod moves along its axial direction, the suction cup is pulled up to be deformed or lowered to be restored driven by the flexible body in the hole and the step.

As an improvement of the present invention, the step is provided with a plurality of layers, and the holes are defined in at least one layer of the step. The suction cup is provided with a suction cup groove body. Both a bottom portion of the connecting rod and the step are accommodated in the suction cup groove body.

As an improvement of the present invention, the suction cup is integrally formed with both the connecting rod and the flexible body by second stage injection molding.

As an improvement of the present invention, the bracket further includes a support rod and a support main body. The support main body is used for supporting a mobile phone. One end of the support rod is rotatably connected to the base, and an opposite end of the support rod is rotatably connected to the support main body.

As an improvement of the present invention, the support rod includes a first telescopic rod and a second telescopic rod. The first telescopic rod is sleeved on the second telescopic rod, and the second telescopic rod is telescopic within the first telescopic rod. A magnetic attraction member is provided inside the support main body. The magnetic attraction member is used for adhering an electronic device to the support main body.

As an improvement of the present invention, an accommodating groove is defined in a bottom portion of the support main body. When the first telescopic rod is completely retracted relative to the second telescopic rod, the supporting rod is capable of being accommodated in the accommodating groove, and the support main body is capable of rotating to completely cover a top surface of the base.

Beneficial effects of the present invention are as follows. The bracket is provided in the present invention, including a base. The base includes the base body, the suction cup, and the connecting rod. The suction cup is provided at the bottom portion of the base body. The connecting rod is provided on the base body and connected to the suction cup. The connecting rod is movable between the first position and the second position along its axial direction. When the connecting rod is moved from the second position to the first position along its axial direction, the connecting rod drives the suction cup to rise to form the vacuum negative pressure cavity. When the connecting rod is moved from the first position to the second position along its axial direction, the connecting rod drives the suction cup to descend to release the vacuum negative pressure in the vacuum negative pressure cavity. The present invention can improve the convenience of disassembly and assembly of the base of the bracket, and enhance the suction stability of the base of the bracket.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
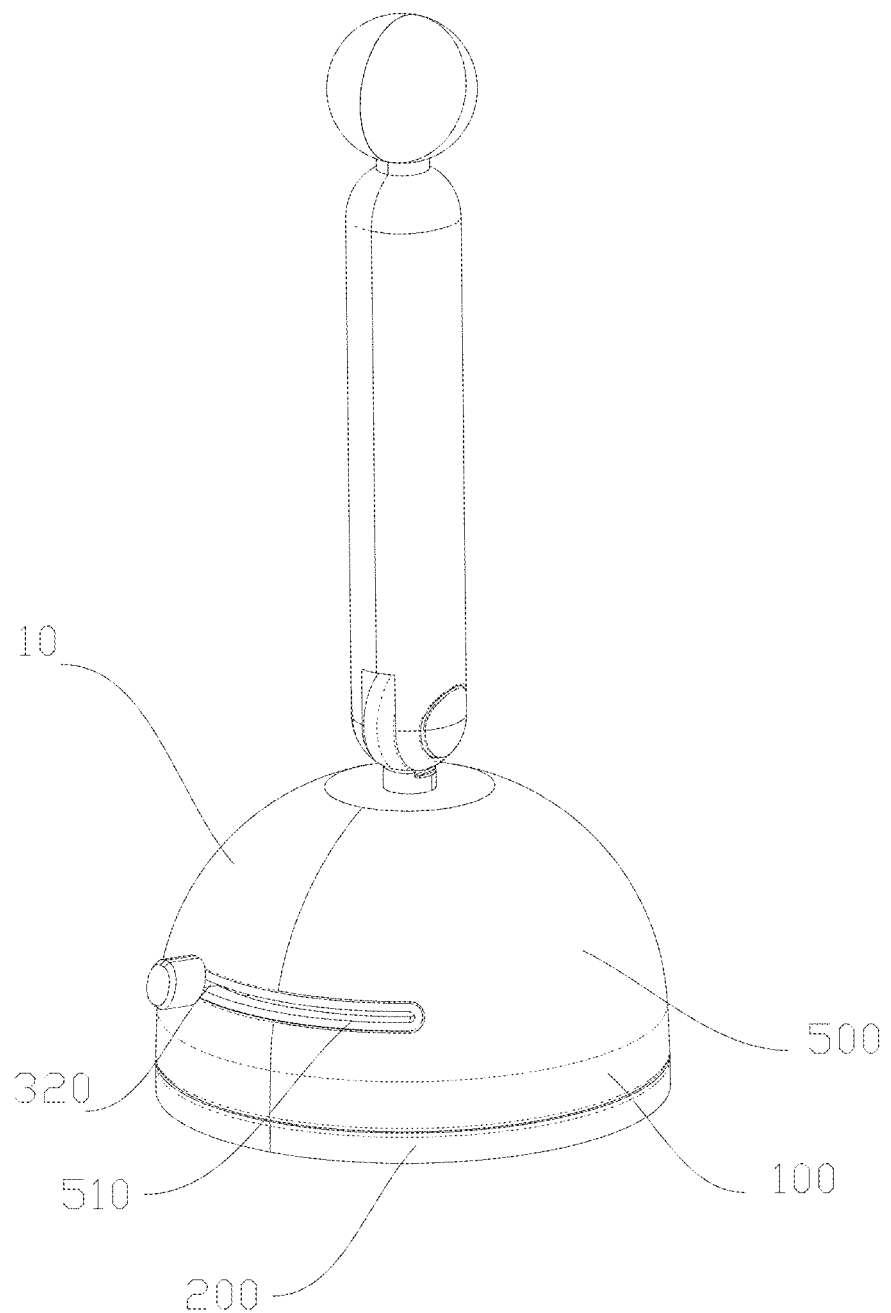
FIG. 1 is a schematic diagram of a structure of a base of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Embodiment One

Figure 2:
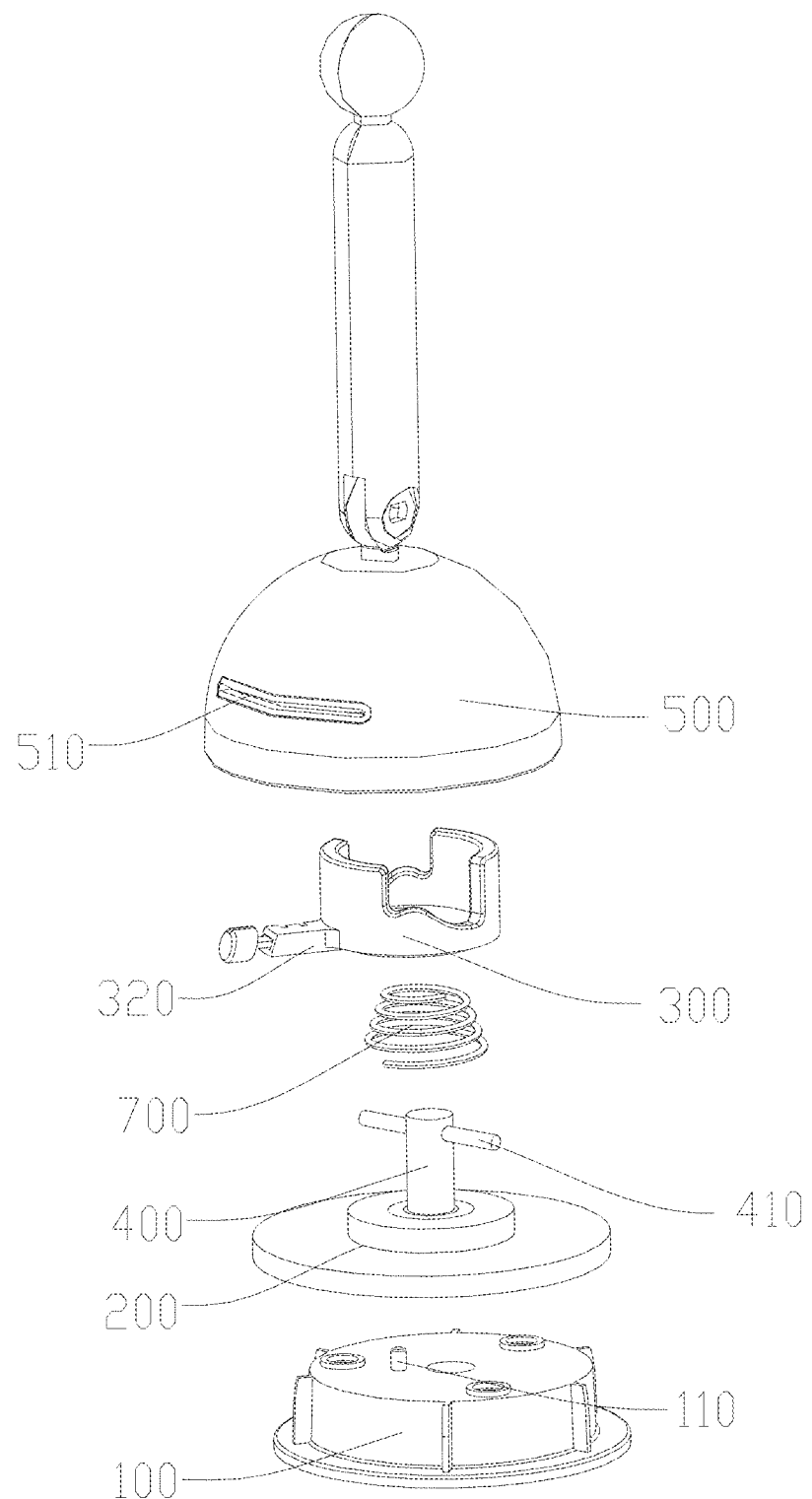
FIG. 2 is an exploded view of a base of the present invention.
Figure 3:
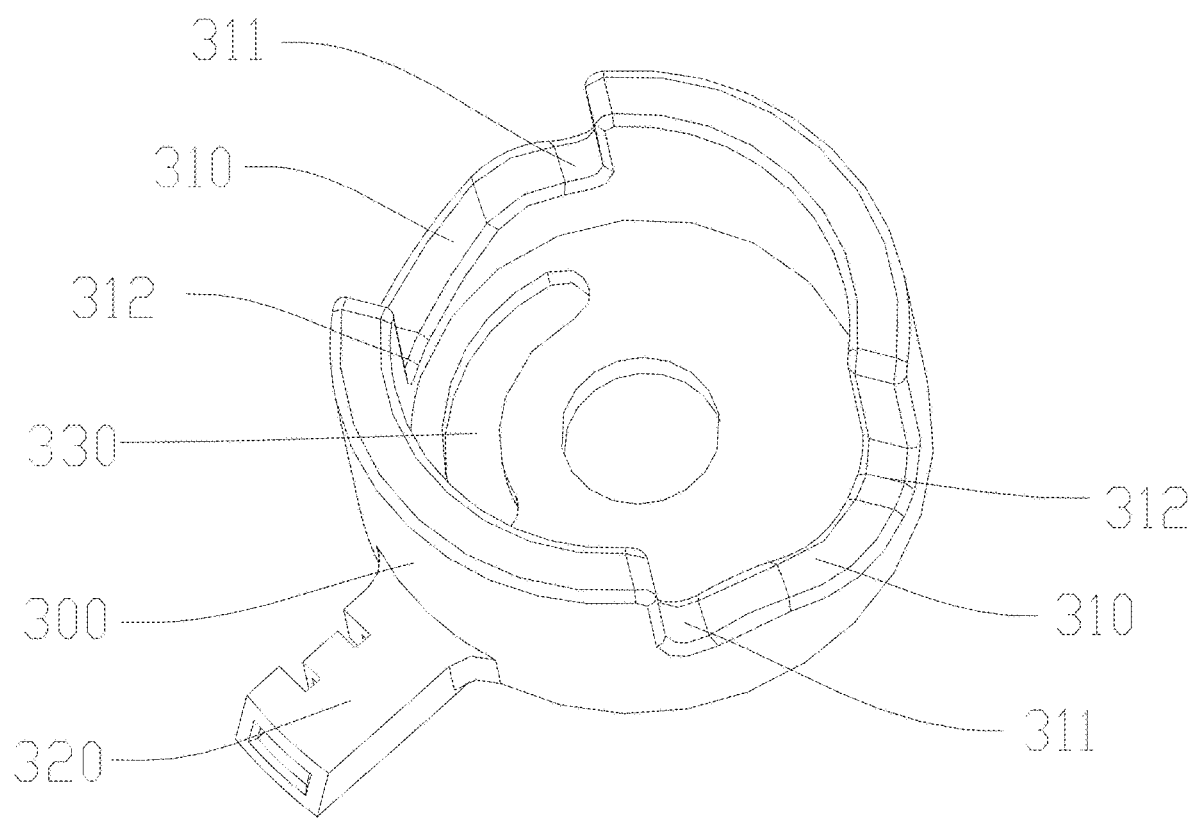
FIG. 3 is a schematic diagram of a structure of a rotating member of the present invention.
Figure 4:
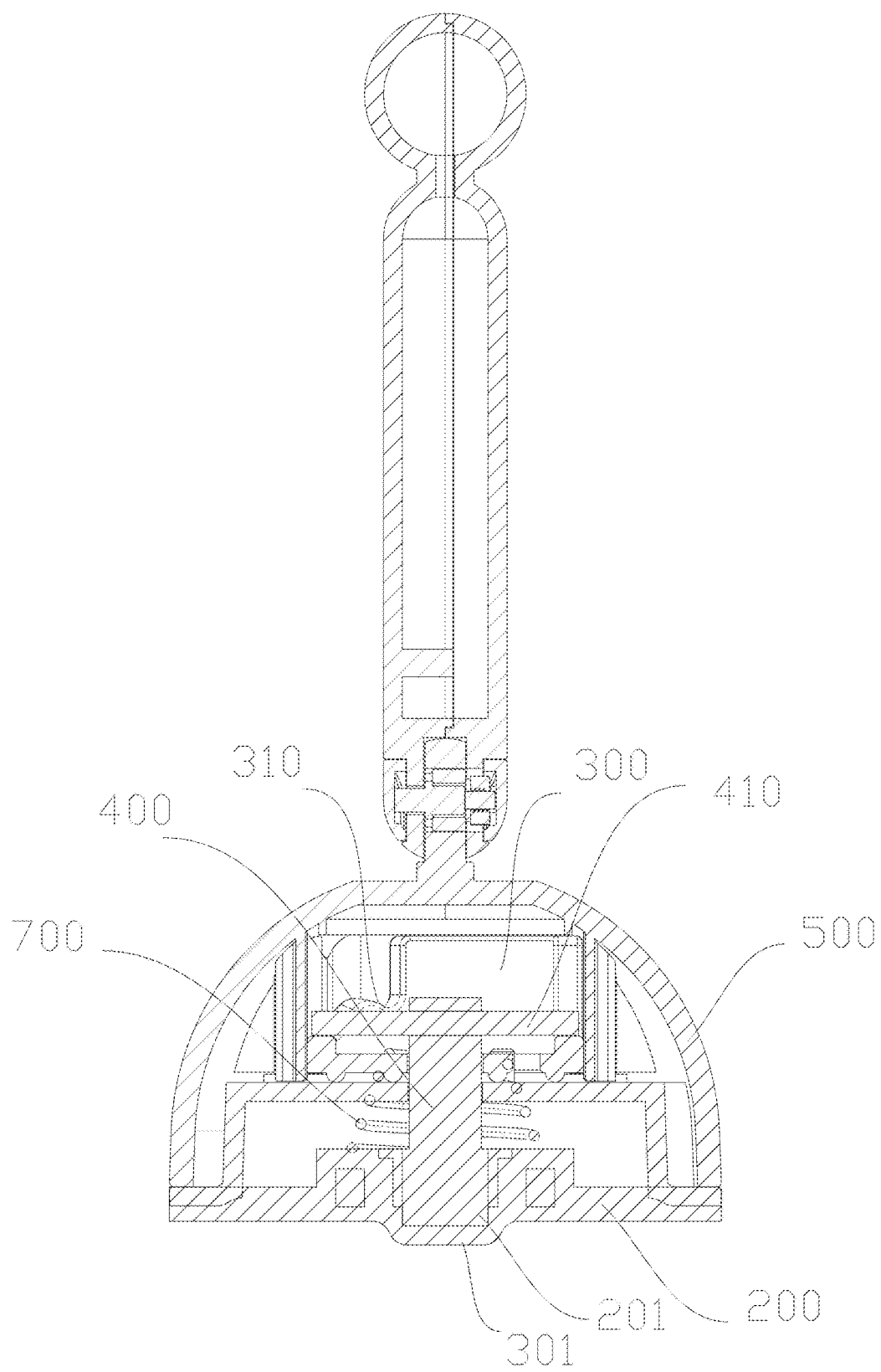
FIG. 4 is a sectional view of the present invention taken along a connecting rod.

As shown in FIGS. 1-4, a bracket provided in this embodiment includes a base 10. The base 10 includes a base body 100. A first cover body 500 is provided on the base body 100. The first cover body 500 is fixedly connected to the base body 100. A cavity is formed between the first cover body 500 and the base body 100. An installation groove 130 is defined in a top portion of the base body 100. A hollow rotating member 300 is provided on the installation groove 130. The rotating member 300 is rotatable relative to the base body 100. At least one climbing track 310 is formed on a top portion of the rotating member 300. This embodiment is preferably provided with two climbing tracks 310 arranged opposite to each other.

The base body 100 is provided with a connecting rod 400. The connecting rod 400 runs through the base body 100. A bottom portion of the connecting rod 400 is connected to a suction cup 200, and a top portion of the connecting rod 400 is configured for running through the rotating member 300.

A pin shaft 410 is provided on the connecting rod 400. The pin shaft 410 cooperates with the climbing track 310 to drive the connecting rod 400 to move between a first position and a second position. A relative climbing motion of the pin shaft 410 along the climbing track 310 drives the connecting rod 400 to move from the second position to the first position, and a relative descending motion of the pin shaft 410 along the climbing track 310 drives the connecting rod 400 to move from the first position to the second position.

The pin shaft 410 can be arranged to be integrally formed with the connecting rod 400. Alternatively, a penetrating hole 103 can be defined in the connecting rod 400, and the pin shaft 410 can be in interference fit inside the penetrating hole 103.

A groove body is defined in the rotating member 300. A bottom groove wall of the groove body is curved to form the climbing track 310. An end portion of the pin shaft 410 extends into the climbing track 310 and performs the relative climbing motion or the relative descending motion relative to the climbing track 310 with rotation of the rotating member 300.

The climbing track 310 is provided with a first position limiting point 311 and a second position limiting point 312. A height of the first position limiting point 311 is higher than a height of the second position limiting point 312. The pin shaft 410 is moved within the climbing track 310 to cooperate with the first position limiting point 311 or the second position limiting point 312 for position limiting.

The rotating member 300 rotates relatively in a third position and a fourth position of the base body 100.

The rotating member 300 rotates relative to the base 10 from the third position to the fourth position, driving the pin shaft 410 to perform the relative climbing motion from the second position limiting point 312 of the climbing track 310 to the first position limiting point 311, thereby driving the connecting rod 400 to move from the second position to the first position.

The rotating member 300 rotates relative to the base body 100 from the fourth position back to the third position, driving the pin shaft 410 to perform the relative descending motion from the first position limiting point 311 of the climbing track 310 back to the second position limiting point 312, thereby driving the connecting rod 400 to move from the first position to the second position.

A swing groove 510 in communication with an internal cavity is defined in the first cover body 500. A swing rod 320 is provided on an outer wall of the rotating member 300. An end portion of the swing rod 320 passes through the swing groove 510 and extends out of the first cover body 500. In actual use, rotating the swing rod 320 can drive the rotating member 300 to rotate on the base body 100, and a rotation angle is limited by an angle between the swing rod 320 and two end groove walls of the swing groove 510.

Moreover, at least one rubber ring 350 is provided at a bottom portion of the rotating member 300. When the rotating member 300 is installed in the installation groove 130, the rubber ring 350 abuts against both the installation groove 130 and the rotating member 300 to increase a friction force during the rotation of the rotating member 300.

A restoration spring 700 is sleeved on an outer wall of the connecting rod 400. One end of the restoration spring 700 abuts against the suction cup 200, and an opposite end of the restoration spring 700 abuts against the rotating member 300, so as to assist in restoring the connecting rod 400 and the suction cup 200.

Specifically, the rotating member 300 is driven by the swing rod 320 to rotate, and the pin shaft 410 performs the relative climbing motion along the climbing track 310 to enter the first position limiting point 311 with a higher height from the second position limiting point 312 with a lower height. After the suction cup 200 is lifted to form a vacuum negative pressure cavity to adhere to an object, the connecting rod 400 drives the suction cup 200 to lift to compress the restoration spring 700. When the suction cup 200 needs to release vacuum negative pressure in the vacuum negative pressure cavity to be separated from the object, the rotating member 300 is driven by the restoration of the swing rod 320 to rotate reversely to be restored, and an elastic force of the restoration spring 700 assists the suction cup 200 and the connecting rod 400 in being restored.

A top portion of the base body 100 is provided with a first position limiting rod 110. A first arc-shaped position limiting groove 330 is defined in the rotating member 300. The first position limiting rod 110 passes through the first arc-shaped position limiting groove 330 and cooperates with two end groove walls of the first arc-shaped position limiting groove 330 for position limiting.

The suction cup 200 in this embodiment is preferably any one of a TPE suction cup 200, a silicone suction cup 200, or a PVC suction cup 200.

A top portion of the first cover body 500 is hinged with a connecting rod structure, which is used for connecting with a bracket for fixing a mobile phone, another intelligent device, or a photographing device.

Usage steps of the base 10 of the bracket in this embodiment are as follows:

1. When the base 10 of the bracket needs to be adhered to an object:
   attaching the suction cup 200 onto the object that needs to be adhered; and
   swinging the swing rod 320 within a range of the swing groove 510 until the pin shaft 410 disengages from the second position limiting point 312 and then enters the first position limiting point 311.

During this process, due to the rotation of the rotating member 300 on the base body 100, while a position of the connecting rod 400 and a position of the pin shaft 410 on the connecting rod 400 remain unchanged, the pin shaft 410 performs the relative climbing motion along the climbing track 310, driving the connecting rod 400 to drive the suction cup 200 to lift and deform, and at the same time compressing the restoration spring 700, thereby forming a vacuum negative pressure cavity between the suction cup 200 and the object to achieve suction on the object.

2. When the base 10 of the bracket needs to detach from the adhered object:
   swinging the swing rod 320 reversely until the pin shaft 410 disengages from the first position limiting point 311 and then enters the second position limiting point 312.

During this process, the rotating member 300 performs the relative descending motion along the climbing track 310 to achieve restoration, and cooperates with the elastic force of the restoration spring 700 to drive the connecting rod 400 and the suction cup 200 to be restored, releasing the vacuum negative pressure in the vacuum negative pressure cavity, causing the suction of the suction cup 200 to fail and achieving detachment from the object.

Embodiment Two

Figure 10:
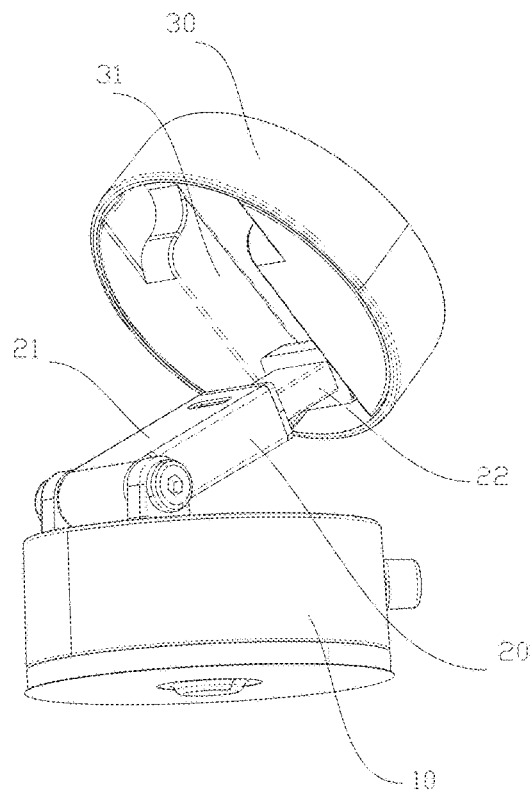
FIG. 10 is a schematic diagram of an overall structure of an open state of a bracket according to the present invention.
Figure 11:
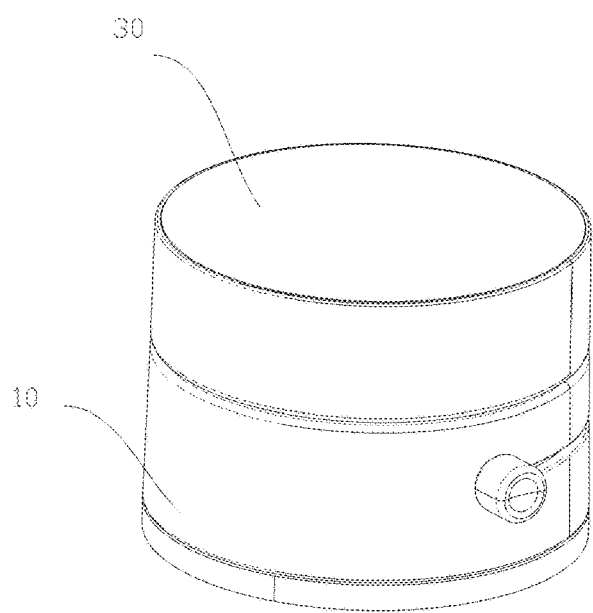
FIG. 11 is a schematic diagram of an overall structure of a closed state of a bracket according to the present invention.

As shown in FIGS. 1-4 and FIGS. 10-11, based on the embodiment one, the bracket further includes a support rod 20 and a support main body 30. The support main body 30 is used for supporting a mobile phone. One end of the support rod 20 is rotatably connected to the base 10, and an opposite end of the support rod 20 is rotatably connected to the support main body 30.

Furthermore, the support rod 20 includes a first telescopic rod 21 and a second telescopic rod 22. The first telescopic rod 21 is sleeved on the second telescopic rod 22, and the second telescopic rod 22 is telescopic within the first telescopic rod 21. A magnetic attraction member is provided inside the support main body 30. The magnetic attraction member is used for adhering an electronic device to the support main body 30.

Furthermore, an accommodating groove 31 is defined in a bottom portion of the support main body 30. When the first telescopic rod 21 is completely retracted relative to the second telescopic rod 22, the supporting rod 20 is capable of being accommodated in the accommodating groove 31, and the support main body 30 is capable of rotating to completely cover a top surface of the base 10.

Through the above structure, a user can place a mobile phone on the support main body 30 in a magnetic attraction manner. When the bracket is not used, the support rod can be retracted and folded into the accommodating groove 31 of the support main body 30, which is simple and clever, reduces storage area, and is easy to carry.

Embodiment Three

Figure 5:
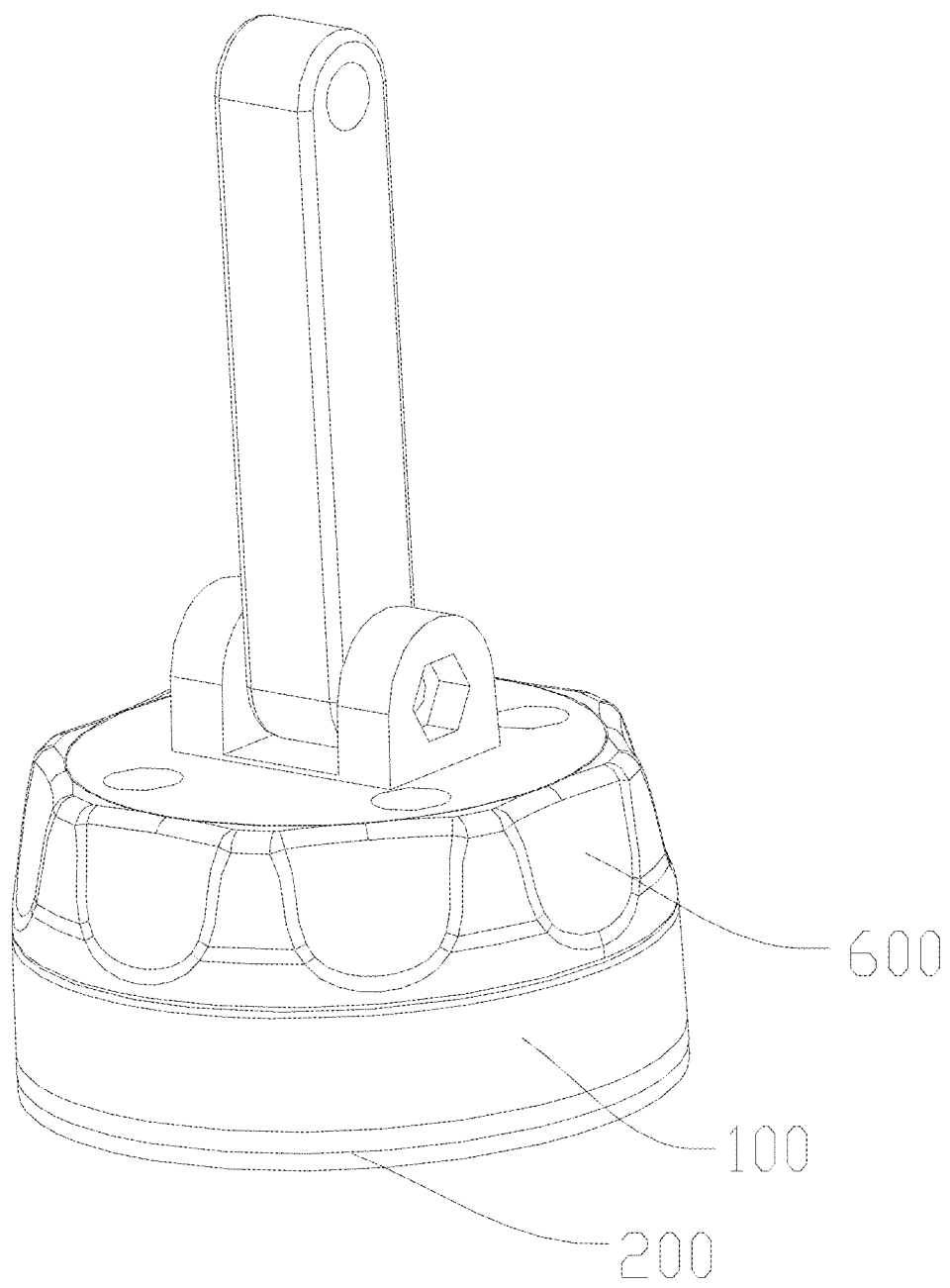
FIG. 5 is a schematic diagram of a structure of another base of the present invention.
Figure 6:
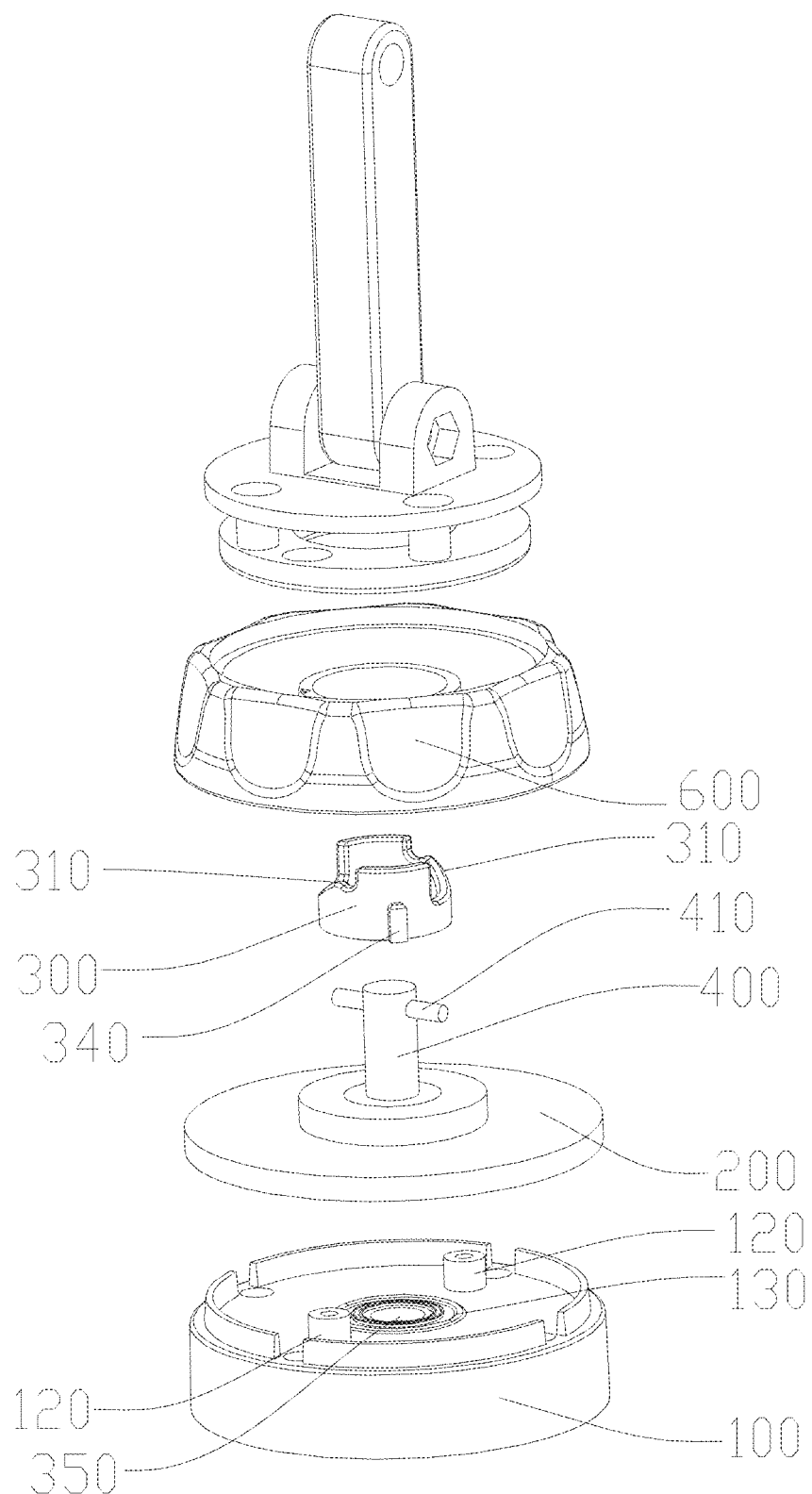
FIG. 6 is an exploded view of another base of the present invention.
Figure 7:
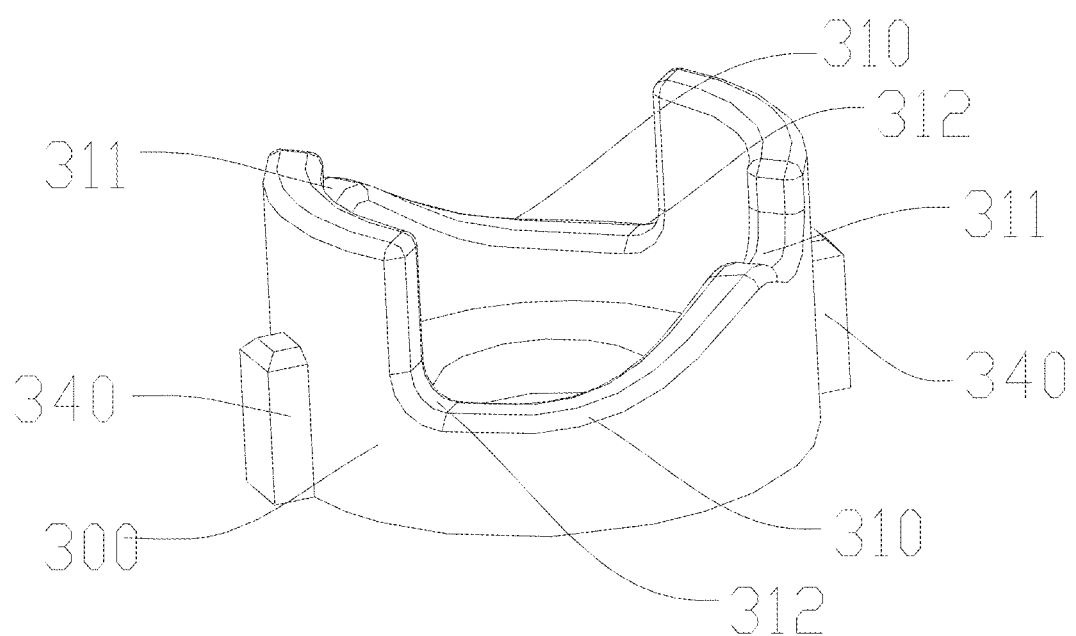
FIG. 7 is a schematic diagram of a structure of another rotating member of the present invention.
Figure 8:
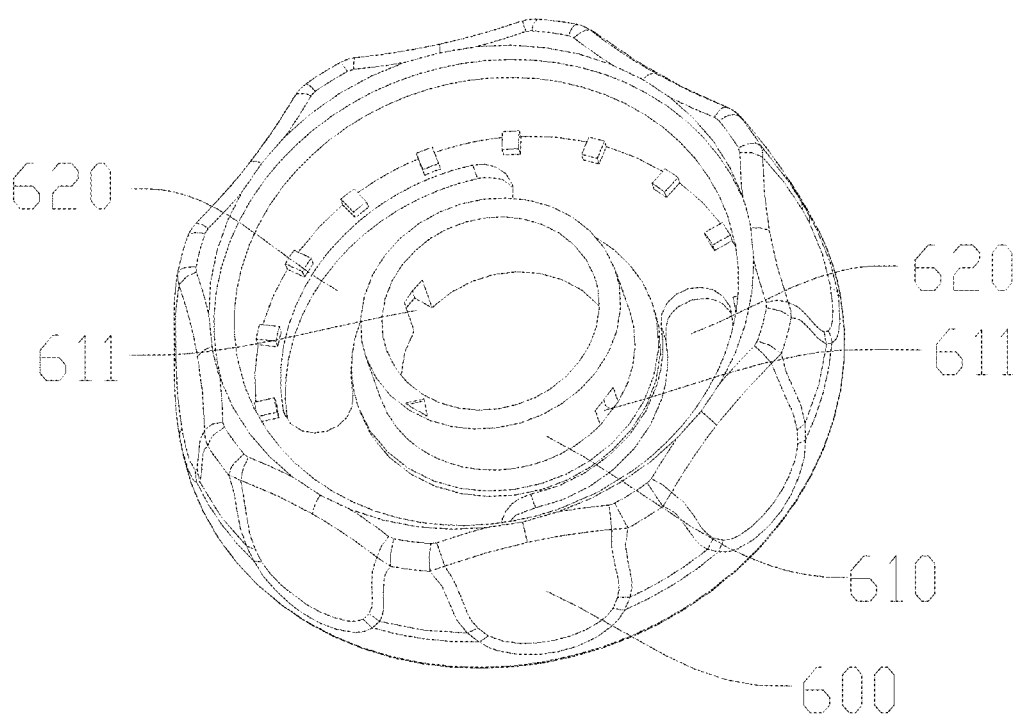
FIG. 8 is a schematic diagram of a structure of a second cover body of the present invention.
Figure 9:
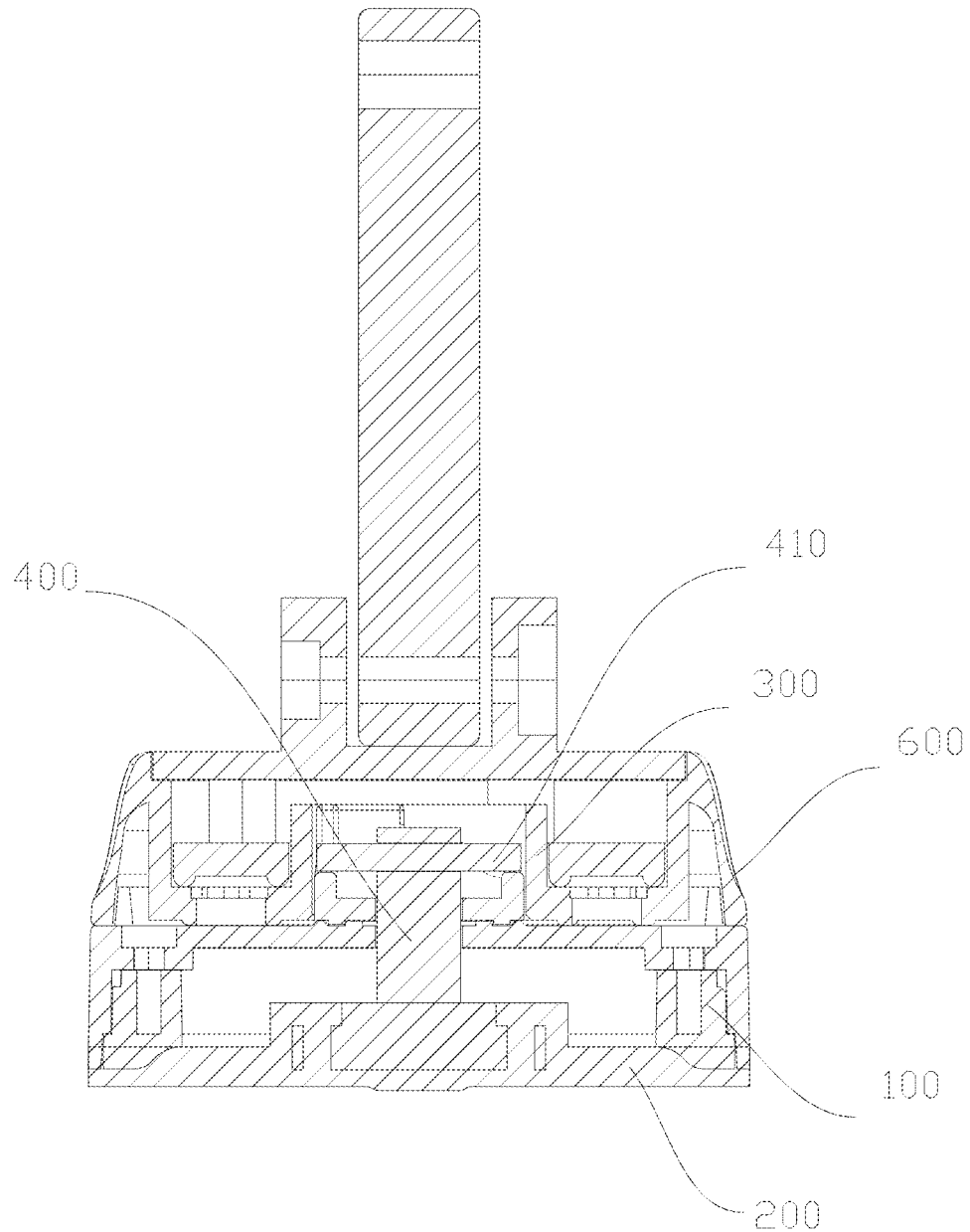
FIG. 9 is a sectional view of the present invention taken along another connecting rod.

As shown in FIGS. 5-9, in this embodiment, the base body 100 is covered with a second cover body 600. The second cover body 600 is rotatable relative to the base body 100. The second cover body 600 is provided with a connecting sleeve 610. The connecting sleeve 610 is sleeved on the rotating member 300. An inner wall of the connecting sleeve 610 is provided with connecting grooves 611. An outer wall of the rotating member 300 is provided with connecting convex blocks 340. When the connecting sleeve 610 is sleeved on the rotating member 300, the connecting convex block 340 is inserted into the connecting groove 611, so that when the second cover body 600 rotates relative to the base body 100, the second cover body 600 drives the rotating member 300 to rotate, which can better prevent a disengagement structure of the suction cup 200 from being touched by mistake.

Correspondingly, at least one second position limiting rod 120 is provided on a top surface of the base body 100. The second cover body 600 is provided with a second arc-shaped position limiting groove 620 on a side portion of the connecting sleeve 610. The second arc-shaped position limiting groove 620 corresponds to the second position limiting rod 120. The second position limiting rod 120 passes through the second arc-shaped position limiting groove 620 and cooperates with two end groove walls of the second arc-shaped position limiting groove 620 for position limiting.

A top portion of the second cover body 600 is hinged with a connecting rod structure, which is used for connecting with a bracket for fixing a mobile phone, another intelligent device, or a photographing device.

Other structures of this embodiment are identical with embodiment one, and will not be repeated here.

Usage steps of the base 10 of the bracket in this embodiment are as follows:

1. When the base 10 of the bracket needs to be adhered to an object:
   attaching the suction cup 200 onto the object that needs to be adhered; and
   rotating the second cover body 600 to drive the rotating member 300 to rotate until the pin shaft 410 disengages from the second position limiting point 312 and then enters the first position limiting point 311.

During this process, the pin shaft 410 performs a relative climbing motion along the climbing track 310, driving the connecting rod 400 to drive the suction cup 200 to lift and deform, and at the same time compressing the restoration spring 700, forming a vacuum negative pressure cavity between the suction cup 200 and the object to achieve suction on the object.

2. When the base 10 of the bracket needs to detach from the adhered object:
   rotating the second cover body 600 reversely until the pin shaft 410 disengages from the first position limiting point 311 and then enters the second position limiting point 312.

In this process, the rotating member 300 rotates relative to the base body 100 to achieve restoration, and cooperates with an elastic force of the restoration spring 700 to drive the connecting rod 400 and the suction cup 200 to be restored, releasing the vacuum negative pressure in the vacuum negative pressure cavity, causing the suction of the suction cup 200 to fail and achieving detachment from the object.

Embodiment Four

Figure 12:
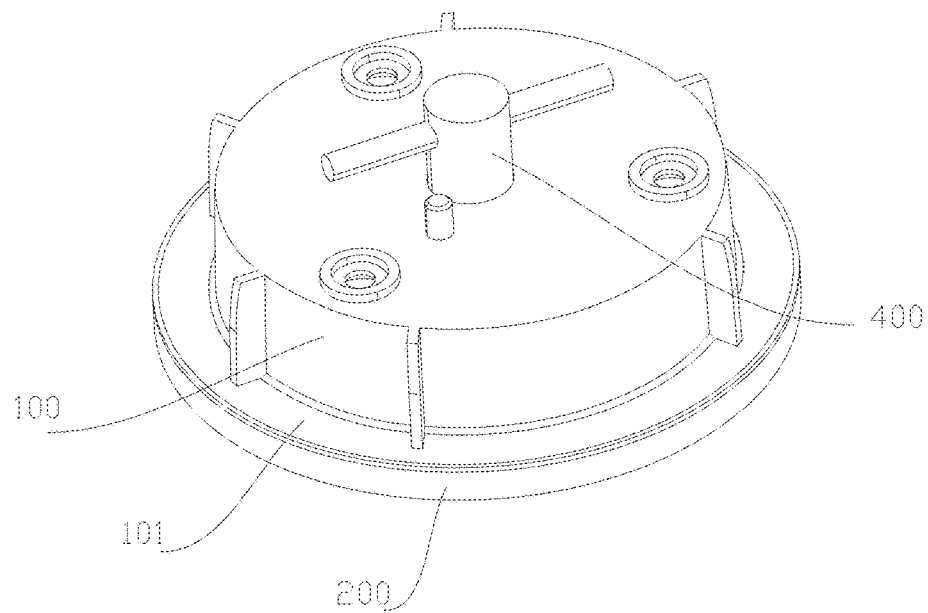
FIG. 12 is a schematic diagram of a partial structure of a base of the present invention.
Figure 13:
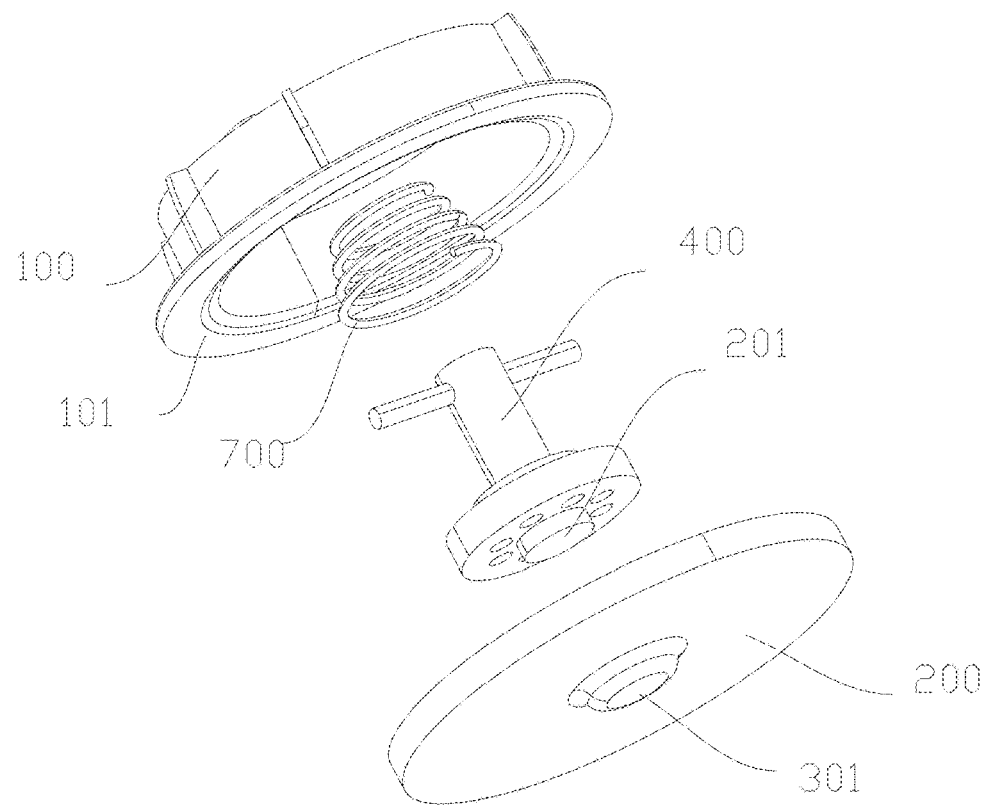
FIG. 13 is an exploded view of a partial structure of a base of the present invention.

As shown in FIGS. 1-4 and FIGS. 12-13, a base 10 of a bracket is provided in this embodiment. The base 10 includes a base body 100. A suction cup 200 is provided at a bottom portion of the base body 100. The suction cup 200 is made of plastic or silicone material. This embodiment preferably uses one of TPE suction cup 200, PVC suction cup 200, or silicone suction cup 200. A connecting rod 400 is also provided on the base body 100. The connecting rod 400 runs through the base body 100. A bottom portion of the connecting rod 400 is connected to the suction cup 200.

Moreover, the connecting rod 400 is movable along its own axial direction on the base body 100, driving the suction cup 200 to lift or descend.

A protrusion 301 is provided at a central position of the suction cup 200. A bottom portion of the protrusion 301 is positioned below a bottom portion of the suction cup 200. It can be understood that in a natural state, a height of the protrusion 301 is higher than a height of a suction surface of the suction cup 200.

Moreover, an area of the protrusion 301 accounts for 2%-65% of an area of the suction cup 200.

Optionally, the connecting rod 400 and suction cup 200 are integrally formed. Alternatively, the connecting rod 400 and the suction cup 200 is integrally formed by second stage injection molding (an injection molding process), so that the bottom portion of the connecting rod 400 is wrapped by the suction cup 200.

A bottom portion of the connecting rod 400 is provided with a protruding column 201. The protruding column 201 is positioned inside the suction cup 200, so that both one part of the connecting rod 400 and the protruding column 201 are accommodated inside the suction cup 200. At least one part of the protruding column 201 is positioned below the suction cup 200, thus forming the protrusion 301.

A bottom portion of the base body 100 is provided with a rim 101. The rim 101 corresponds to an outer peripheral edge of the suction cup 200.

In practical use, the suction cup 200 cooperates with the base body 100 to form a disengaged state or a suction state, and the connecting rod 400 is moved along its axial direction to form a first position and a second position.

The connecting rod 400 is moved from the first position to the second position along its axial direction, driving the connecting rod 400 to descend. The protrusion 301 abuts against the suction surface of the suction cup 200, and the vacuum negative pressure in the vacuum negative pressure cavity between the suction cup 200 and the suction surface is released, thus forming the disengaged state.

The connecting rod 400 is moved from the second position back to the first position along its axial direction, driving the connecting rod 400 to lift and pull the suction cup 200 connected to the connecting rod 400 to deform upward. A first gap is defined between the protrusion 301 and the suction surface of the suction cup 200. The rim 101 on the base body 100 presses against the peripheral edge of the suction cup 200, and the suction cup 200 forms the vacuum negative pressure cavity with the suction surface, thus forming the suction state.

A restoration spring 700 is sleeved on the connecting rod 400. One end of the restoration spring 700 abuts against the suction cup 200, and on opposite end of the restoration spring 700 abuts against the base body 100. After the connecting rod 400 is lifted along its axial direction, the suction cup 200 and the base body 100 cooperate to compress the restoration spring 700, so that when the connecting rod 400 descends to be restored, an elastic restoration force of the restoration spring 700 can assist in the restoration of the connecting rod 400, improving the convenience of the restoration.

Embodiment Five

As shown in FIGS. 1-4 and FIGS. 12-13, based on the embodiment four, this embodiment also includes a rotatable rotating member 300 at a top portion of the base body 100. The rotating member 300 has a hollow structure, and two climbing tracks 310 opposite to each other are arranged at a top portion of the rotating member 300. Each of the climbing tracks 310 is provided with a first position limiting point 311 and a second position limiting point 312. The first position limiting point 311 and the second position limiting point 312 have different heights. A top portion of the connecting rod 400 is equipped with a pin shaft 410. The pin shaft 410 is mounted on the rotating member 300, and two ends of the pin shaft 410 extend into the climbing tracks 310 respectively corresponding to the two ends of the pin shaft 410.

A first cover body 500 is provided on the base body 100. The first cover body 500 covers the rotating member 300, the connecting rod 400, and the pin shaft 410 inside. A swing groove 510 penetrating through the first cover body 500 is defined in the first cover body 500. A swing rod 320 is provided on an outer wall of the rotating member 300. The swing rod 320 passes through the swing groove 510 and extends out of the first cover body 500.

In actual use, a user rotates the swing rod 320 to make the rotating member 300 rotate, and the pin shaft 410 moves from a positioning part with a lower height to a positioning part with a higher height, so that the connecting rod 400 is driven to lift along its axial direction, the suction cup 200 is pulled up and deformed upward, and the rim 101 is pressed against an outer peripheral edge of the suction cup 200, thus forming a vacuum negative pressure cavity between the suction cup 200 and a suction surface to complete the suction.

On the contrary, by rotating the swing rod 320 reversely, the rotating member 300 is restored, and the pin shaft 410 moves from the positioning part with a higher height to the positioning part with a lower height, driving the connecting rod 400 to descend to be restored along its axial direction. The suction cup 200 and the protrusion 301 are restored with the assistance of the restoration spring 700. The protrusion 301 abuts against the suction surface, and the rim 101 no longer presses against the outer peripheral edge of the suction cup 200, releasing the vacuum negative pressure inside the vacuum negative pressure cavity between the suction cup 200 and the suction surface, thereby completing the detachment of the suction cup 200 from the suction surface.

Embodiment Six

Figure 14:
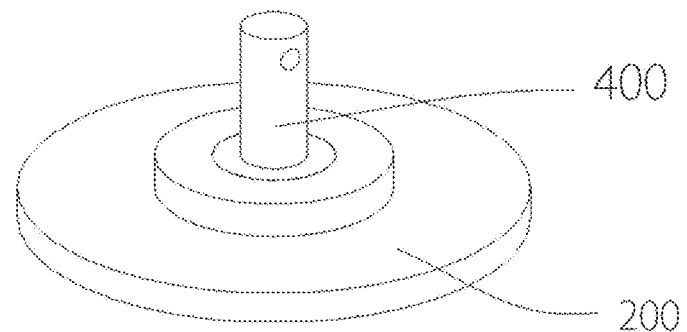
FIG. 14 is a schematic structural diagram of a suction cup structure of the present invention.
Figure 15:
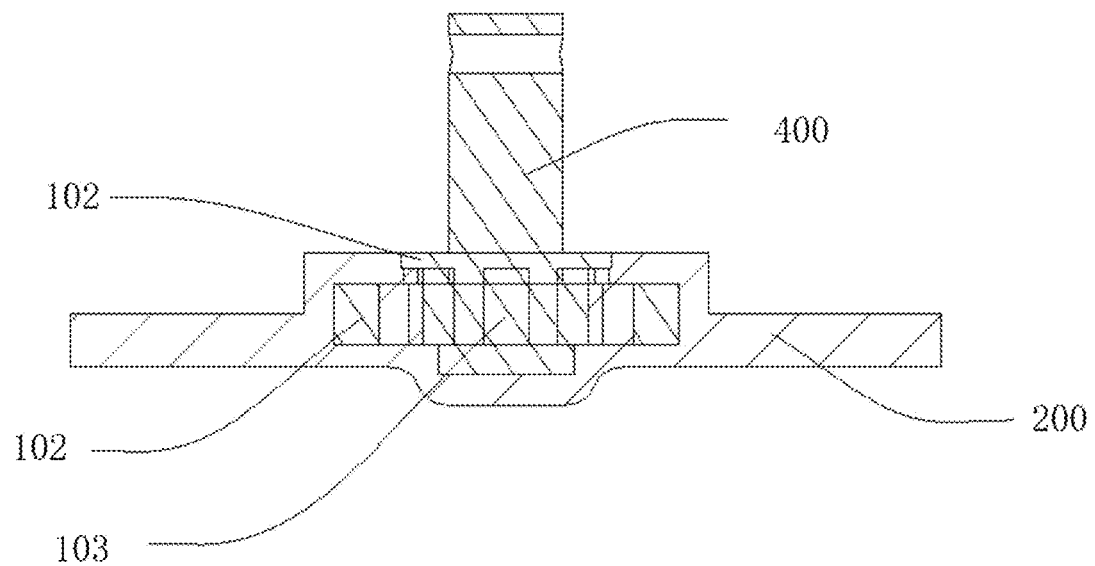
FIG. 15 is a cross-sectional view of a suction cup structure of the present invention.
Figure 16:
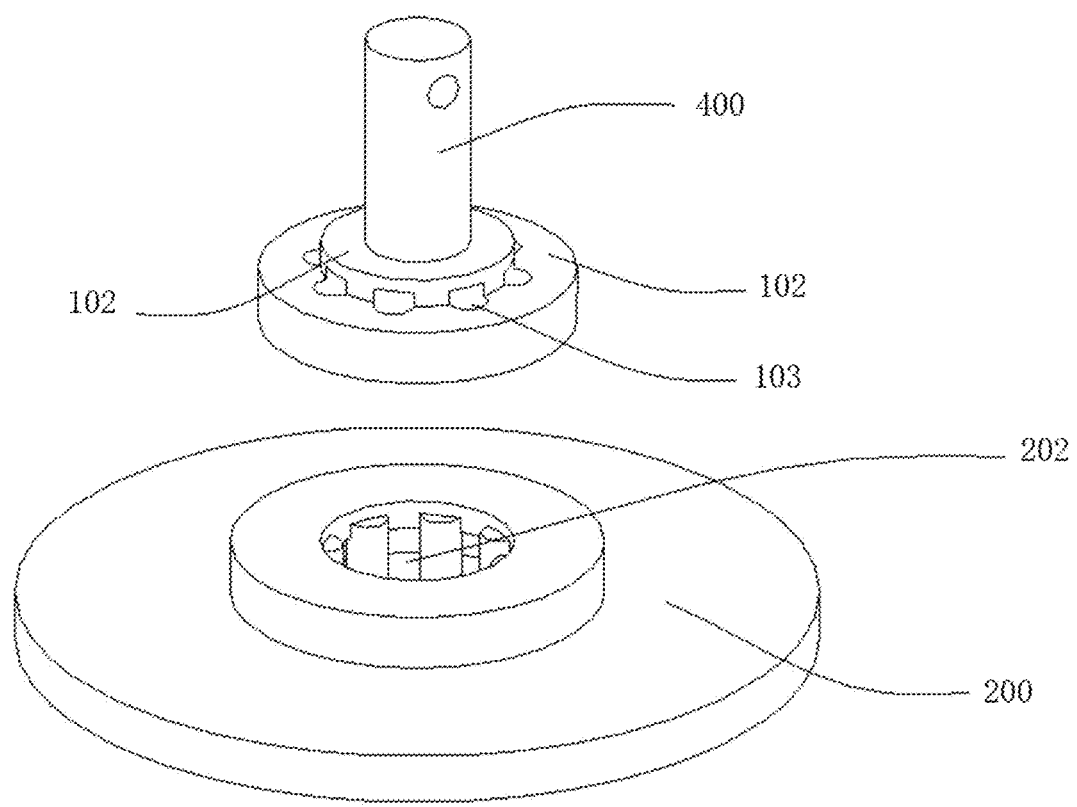
FIG. 16 is an exploded view of a suction cup structure of the present invention.

As shown in FIGS. 1-4 and FIGS. 14-16, a suction cup structure includes a connecting rod 400 and a suction cup 200. The suction cup 200 is arranged on a bottom portion of the connecting rod 400 and is connected to the connecting rod 400. A step 102 is provided on the connecting rod 400. The step 102 is provided with a plurality of layers, and a plurality of holes 103 are defined in at least one layer of the step 102. A flexible body is provided inside the hole 103, and the flexible body is connected to the suction cup 200. The holes 103 in this embodiment are preferably arranged in an annular array along an axis of the connecting rod 400.

A suction cup groove body 202 is provided inside the suction cup 200. The suction cup groove body 202 is used for accommodating the bottom portion of the connecting rod 400 and the step 102.

The suction cup 200 is integrally formed and connected with both the connecting rod 400 and the flexible body by second stage injection molding. Mainly, the connecting rod 400 is first placed into an injection mold of the suction cup 200, and while the suction cup 200 is formed by injection molding, the suction cup groove body 202 is formed in the suction cup 200 to accommodate and wrap the bottom portion of the connecting rod 400 and the step 102. Moreover, the hole 103 on the step 102 is injected with the flexible body to connect the step 102 and the suction cup 200 together, improving the stability of the connection between the connecting rod 400 and the suction cup 200.

In practical use, the connecting rod 400 of this embodiment is capable of moving up and down along its own axial direction. During the process of moving up and down, the step 102 on the connecting rod 400 and the flexible body in the hole 103 in the step 102 cooperate to drive the suction cup 200 to be pulled up and deformed to form a vacuum negative pressure cavity, or to be lowered and restored to release vacuum negative pressure in the vacuum negative pressure cavity, thereby achieving suction connection or detachment between the suction cup 200 and a suction surface.

Embodiment Seven

As shown in FIGS. 1-9 and FIGS. 14-16, a base 10 of a bracket is provided in this embodiment, including a base body 100. A bottom portion of the base body 100 is provided with the suction cup 200 and the connecting rod 400 of embodiment six. The connecting rod 400 runs through the base body 100, and a top portion of the connecting rod 400 extends above the base body 100.

A groove is defined in a top portion of the base body 100. A rotating member 300 is provided inside the groove. The rotating member 300 rotates along a circumferential direction of the connecting rod 400, and the rotating member 300 is hollow. The connecting rod 400 runs through the rotating member 300. Two climbing tracks 310 are provided on the rotating member 300. Each of the climbing tracks 310 is provided with a first position limiting point 311 and a second position limiting point 312. A height of the first position limiting point 311 is different from a height of the second position limiting point 312.

A pin shaft 410 is provided on the connecting rod 400. The pin shaft 410 is mounted on the rotating member 300. The pin shaft 410 has two opposite ends. Each end of the pin shaft 410 extends into a corresponding climbing track 310.

A restoration spring 700 is sleeved on the connecting rod 400. One end of the restoration spring 700 abuts against the suction cup 200, and an opposite end of the restoration spring 700 abuts against the base body 100.

Optionally, a swing rod 320 is provided on an outer wall of the rotating member 300. A first cover body 500 is provided on the base body 100. The first cover body 500 is fixedly connected to the base body 100, and a swing groove 510 is defined in the first cover body 500. An end portion of the swing rod 320 passes through the swing groove 510 and extends out of the first cover body 500.

When in use, the swinging rod 320 is rotated within the swinging groove 510 to drive the rotating member 300 to rotate, causing the pin shaft 410 to switch between the first position limiting point 311 and the second position limiting point 312, thereby driving the suction cup structure in the embodiment to ascend and descend, achieving suction connection or detachment between the suction cup 200 and a suction surface.

Optionally, connecting convex blocks 340 are provided on an outer wall of the rotating member 300. A second cover body 600 is provided on the base body 100. The second cover body 600 rotates relative to the base body 100. Connecting grooves 611 are defined in the second cover body 600. The connecting convex blocks 340 are engaged with the connecting grooves 611.

When in use, the second cover body 600 is rotated to drive the rotating member 300 to rotate, causing the pin shaft 410 to switch between the first position limiting point 311 and the second position limiting point 312, thereby driving the suction cup structure in the embodiment to ascend and descend, achieving suction connection or detachment between the suction cup 200 and the suction surface.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A bracket, comprising:
a base,
wherein the base comprises:
a base body;
a suction cup provided at a bottom portion of the base body; and
a connecting rod provided on the base body and connected to the suction cup;
wherein the connecting rod is movable between a first position and a second position along its axial direction;
when the connecting rod is moved from the second position to the first position along its axial direction, the connecting rod is configured for driving the suction cup to rise to form a vacuum negative pressure cavity; and when the connecting rod is moved from the first position to the second position along its axial direction, the connecting rod is configured for driving the suction cup to descend to release vacuum negative pressure in the vacuum negative pressure cavity;
wherein the base body is provided with a rotating member, the rotating member is rotatable relative to the base body;
the base body is covered with a first cover body; and a swing groove is horizontally defined in the first cover body; the swing groove is parallel to a bottom surface of the suction cup;
the rotating member is connected with a swing rod; an end portion of the swing rod passes through the swing groove and extends out of the first cover body;
wherein a rotation angle of the rotating member is limited by two end groove walls of the swing groove.

2. The bracket according to claim 1, wherein the connecting rod is connected with a pin shaft; the base body is equipped with climbing tracks; the pin shaft cooperates with the climbing track to drive the connecting rod to move between the first position and the second position; a relative climbing motion of the pin shaft along the climbing track drives the connecting rod to move from the second position to the first position; and a relative descending motion of the pin shaft along the climbing track drives the connecting rod to move from the first position to the second position.

3. The bracket according to claim 2, wherein the climbing track is formed on the rotating member; an end portion of the pin shaft extends into the climbing track and performs the relative climbing motion or the relative descending motion relative to the climbing track with the rotation of the rotating member;
the climbing track comprises a first position limiting point and a second position limiting point; and the first position limiting point is higher than the second position limiting point;
a total number of the climbing tracks is two; the two climbing tracks are opposite to each other and are arranged at positions of a top portion of the rotating member.

4. The bracket according to claim 3, wherein the rotating member rotates relatively in a third position and a fourth position of the base body;
the rotating member rotates relative to the base from the third position to the fourth position, driving the pin shaft to perform the relative climbing motion from the second position limiting point of the climbing track to the first position limiting point, thereby driving the connecting rod to move from the second position to the first position;
the rotating member rotates relative to the base body from the fourth position back to the third position, driving the pin shaft to perform the relative descending motion from the first position limiting point of the climbing track back to the second position limiting point, thereby driving the connecting rod to move from the first position to the second position.

5. The bracket according to claim 3, wherein the rotating member, the connecting rod, and the pin shaft are positioned inside the first cover body.

6. The bracket according to claim 3, wherein a top surface of the base body is provided with a first position limiting rod; a first arc-shaped position limiting groove is defined in the rotating member; and the first position limiting rod passes through the first arc-shaped position limiting groove and cooperates with two ends of the first arc-shaped position limiting groove for position limiting.

7. The bracket according to claim 3, wherein a restoration spring is sleeved on the connecting rod; one end of the restoration spring abuts against the suction cup; and an opposite end of the restoration spring abuts against the rotating member.

8. The bracket according to claim 3, wherein the base body is provided with a second cover body; the rotating member, the connecting rod, and the pin shaft are positioned inside the second cover body; and a connecting sleeve is provided in the second cover bod;
connecting convex blocks are provided on an outer wall of the rotating member; and connecting grooves engaged with the connecting convex blocks are defined in an inner wall of the connecting sleeve.

9. The bracket according to claim 8, wherein at least one second position limiting rod is provided on a top surface of the base body; the second cover body is provided with a second arc-shaped position limiting groove corresponding to the second position limiting rod; and the second position limiting rod passes through the second arc-shaped position limiting groove and cooperates with two ends of the second arc-shaped position limiting groove for position limiting.

10. The bracket according to claim 1, wherein a protrusion is provided at a bottom portion of the suction cup; the protrusion extends towards one side away from the base body; when the connecting rod is moved from the first position to the second position along its axial direction, the connecting rod and the suction cup are driven to descend, the protrusion abuts against a suction surface of the suction cup, and the vacuum negative pressure in the vacuum negative pressure cavity between the suction cup and the suction surface is released, thus forming a disengaged state.

11. The bracket according to claim 10, wherein a height of the protrusion is higher than a height of the suction surface of the suction cup; a bottom portion of the base body is provided with a rim; and the rim corresponds to an outer peripheral edge of the suction cup.

12. The bracket according to claim 11, wherein the connecting rod is moved from a second position back to a first position along its axial direction, driving the connecting rod to lift and pull the suction cup connected to the connecting rod to deform upward; a first gap is defined between the protrusion and the suction surface of the suction cup; the rim presses against the outer peripheral edge of the suction cup; and the suction cup and the suction surface form a vacuum negative pressure cavity, thus forming a suction state;

in the suction state, the rim is pressed against the outer peripheral edge of the suction cup;

in the disengaged state, a second gap is defined between the rim and the suction cup, or the rim is in contact with the outer peripheral edge of the suction cup.

13. The bracket according to claim 10, wherein the protrusion is provided at a central position of the suction cup; a bottom portion of the connecting rod is provided with a protruding column; the protruding column is positioned inside the suction cup; and the protruding column is at least partially positioned below the suction cup.

14. The bracket according to claim 10, wherein the connecting rod and the suction cup are integrally formed; the suction cup is made of plastic or silicone material; and an area of the protrusion accounts for 2%-65% of an area of the suction cup.

15. The bracket according to claim 1, wherein a step is provided on the connecting rod; a plurality of holes extending along an axial direction is defined in the step; a flexible body is accommodated in the hole; the suction cup cooperates to receive the step; and the flexible body inside the hole is integrally connected to the suction cup;

when the connecting rod moves along its axial direction, the suction cup is pulled up to be deformed or lowered to be restored driven by the flexible body in the hole and the step.

16. The bracket according to claim 1, further comprising a support rod and a support main body, wherein the support main body is used for supporting a mobile phone; one end of the support rod is rotatably connected to the base; and an opposite end of the support rod is rotatably connected to the support main body.

17. The bracket according to claim 16, wherein the support rod comprises a first telescopic rod and a second telescopic rod; the first telescopic rod is sleeved on the second telescopic rod; the second telescopic rod is telescopic within the first telescopic rod; a magnetic attraction member is provided inside the support main body; and the magnetic attraction member is used for adhering an electronic device to the support main body.

18. The bracket according to claim 17, wherein an accommodating groove is defined in a bottom portion of the support main body; when the first telescopic rod is completely retracted relative to the second telescopic rod, the supporting rod is capable of being accommodated in the accommodating groove, and the support main body is capable of rotating to completely cover a top surface of the base.

19. A bracket, comprising:
a base,
wherein the base comprises:
a base body;
a suction cup provided at a bottom portion of the base body; and
a connecting rod provided on the base body and connected to the suction cup;
wherein the connecting rod is movable between a first position and a second position along its axial direction;
when the connecting rod is moved from the second position to the first position along its axial direction, the connecting rod is configured for driving the suction cup to rise to form a vacuum negative pressure cavity; and
when the connecting rod is moved from the first position to the second position along its axial direction, the connecting rod is configured for driving the suction cup to descend to release vacuum negative pressure in the vacuum negative pressure cavity;
wherein the bracket further comprises a support rod and a support main body; the support rod comprises a first telescopic rod and a second telescopic rod; the first telescopic rod is sleeved on the second telescopic rod; the second telescopic rod is telescopic within the first telescopic rod; a magnetic attraction member is provided inside the support main body; and the magnetic attraction member is used for adhering an electronic device to the support main body.

20. The bracket according to claim 1, wherein the swing rod is perpendicular to the connecting rod.

* * * * *